United States Patent
Klement et al.

(10) Patent No.: US 9,922,244 B2
(45) Date of Patent: Mar. 20, 2018

(54) FAST AND ROBUST IDENTIFICATION OF EXTREMITIES OF AN OBJECT WITHIN A SCENE

(71) Applicant: gestigon GmbH, Luebeck (DE)

(72) Inventors: Sascha Klement, Luebeck (DE); Florian Hartmann, Luebeck (DE); Foti Coleca, Lluebeck (DE); Ibrahim Awada, Luebeck (DE)

(73) Assignee: gestigon GmbH, Luebeck (DE)

( * ) Notice: Subject to any disclaimer, the term of this patent is extended or adjusted under 35 U.S.C. 154(b) by 130 days.

(21) Appl. No.: 14/844,313

(22) Filed: Sep. 3, 2015

(65) Prior Publication Data
US 2017/0068853 A1     Mar. 9, 2017

(51) Int. Cl.
*G06K 9/00*    (2006.01)
*G06K 9/46*    (2006.01)
(Continued)

(52) U.S. Cl.
CPC ........... *G06K 9/00375* (2013.01); *G06K 9/00* (2013.01); *G06K 9/00208* (2013.01);
(Continued)

(58) Field of Classification Search
None
See application file for complete search history.

(56) References Cited

U.S. PATENT DOCUMENTS 7,023,536 B2   4/2006   Zhang et al.
7,038,846 B2   5/2006   Mandella
(Continued)

FOREIGN PATENT DOCUMENTS

WO   WO 2008128568 A1 *  10/2008   ......... G06K 9/00201
WO   WO2011080282          7/2011
WO   WO 2011080282 A1 *   7/2011   ......... G06K 9/00201

OTHER PUBLICATIONS

Efficient Heirarchical Graph-Based Segmentation of RGBD Videos. Steven Hickson, Stan Birchfield, Irfan Essa and Henrik Christensen. Jun. 2014.*

(Continued)

*Primary Examiner* — Delomia L Gillard
(74) *Attorney, Agent, or Firm* — Wood, Phillips, Katz, Clark & Mortimer

(57) ABSTRACT

Described herein are a system and method for identifying extremities of an object within a scene. The method comprises operating an image processing system to receive image data from a sensor. The image data represents an image of the scene with the object. The image data comprises a two-dimensional array of pixels and each pixel contains a depth value indicating distance from the sensor. The image processing system slices the image into slices. Each respective slice comprises those pixels with depth values that lie within a respective range of distances defined relative to a reference. For each of the slices, the method identifies one or more connected regions of pixels that are neighbors in the two-dimensional array of pixels. The method builds, based on the connected region of pixels that have been identified for the slices and depth information inherent to the respective slices, a graph consisting of interconnected nodes. The connected regions form the nodes of the graph and the nodes are interconnected in the graph based on their relative distance to the reference. Extremities of the object are determined based on the graph.

18 Claims, 11 Drawing Sheets

(51) Int. Cl.
  *G06K 9/62* (2006.01)
  *G06T 7/60* (2017.01)
  *G06K 9/34* (2006.01)
(52) U.S. Cl.
  CPC ........... *G06K 9/00362* (2013.01); *G06K 9/34* (2013.01); *G06K 9/469* (2013.01); *G06K 9/627* (2013.01); *G06K 9/6296* (2013.01); *G06T 7/606* (2013.01); *G06K 9/00201* (2013.01); *G06K 9/00335* (2013.01); *G06K 9/342* (2013.01)

(56) References Cited

U.S. PATENT DOCUMENTS

| | | |
|---|---|---|
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,474,809 B2 | 1/2009 | Carl et al. |
| 7,729,515 B2 | 6/2010 | Mandella et al. |
| 7,826,641 B2 | 11/2010 | Mandella et al. |
| 7,961,909 B2 | 6/2011 | Mandella et al. |
| 8,542,219 B2 | 9/2013 | Carl et al. |
| 8,553,935 B2 | 10/2013 | Mandella et al. |
| 8,897,494 B2 | 11/2014 | Mandella et al. |
| 8,970,709 B2 | 3/2015 | Gonzalez-Banos et al. |
| 9,189,856 B1 | 11/2015 | Gonzalez-Banos et al. |
| 9,229,540 B2 | 1/2016 | Mandella et al. |
| 9,235,934 B2 | 1/2016 | Mandella et al. |
| 2009/0304265 A1* | 12/2009 | Khan ................... G06T 15/205 382/154 |
| 2016/0063706 A1 | 3/2016 | Gonzalez-Banos et al. |

OTHER PUBLICATIONS

Hickson Steven et al: Efficient Hierarchical Graph-Based Segmentation of RGBD Videos, 2014 IEEE Conference on Computer Vision and Pattern Recognition (Jun. 23, 2014) pp. 344-351.

Liang-Chia Chen et al: "Object Segmentation Method Using Depth Slicing and Region Growing Algorithms" (Dec. 31, 2013), the whole document.

Van Wen et al., "A Robust Method of Detecting Hand Gestures Using Depth Sensors", Haptic Audio Visual Environments and Games, 2012 IEEE Int'l Workshop (Oct. 8, 2012) pp. 72-77.

* cited by examiner

FAST AND ROBUST IDENTIFICATION OF EXTREMITIES OF AN OBJECT WITHIN A SCENE

CROSS REFERENCE TO RELATED APPLICATIONS

There are no related applications.

FIELD

This application relates to the identification of extremities of an object within a scene and, more particularly, to use of depth data to extract object extremities.

BACKGROUND

Several approaches use contour based image processing methods on segmented hand or body shapes. However, these methods regularly work only when the extremities or fingers are stretched and parallel to the sensor.

In *ACIVS*, volume 3708 of *Lecture Notes in Computer Science*, pages 9-16. Springer, 2005, the authors declare the fingertip to be the contour pixel that is farthest away from the center of gravity of the hand. This method works only for single stretched fingers that do not point towards the sensor.

Multiple fingertips are addressed by Rai Katz, Kevin Gabayan, and Hamid Aghajan, A multi-touch surface using multiple cameras, in *Proceedings of the 9th International Conference on Advanced Concepts for Intelligent Vision Systems*, ACIVS '07, pages 97-108, Berlin, Heidelberg, 2007. Springer-Verlag. Here, the distance of the contour pixels with respect to the palm center is inspected. Local maxima are treated as fingertip candidates. Remaining false positive fingertips (e.g. knuckles of the thumb) are eliminated by analyzing the local contour around the fingertip candidates. True fingertips show a high average distance from the fingertip candidate to the local centroid. Again, this does not work for fingers pointing towards the sensor. Further, the frame rate is claimed to be only 10 Hz.

In Martin Do, Tamim Asfour, and Rudiger Dillmann, Particle filter-based fingertip tracking with circular Hough transform features, ii *MVA2011 IAPR Conference on Machine Vision Applications,* 2011, the Hough-transform is used to detect fingertips in combination with a particle filter and a mean-shift procedure for tracking. This method is computationally expensive. According to the authors it runs at 15 frames per second on a 2.4 GHz Dual Core CPU.

In Ko-Jen Hsiao, Tse-Wei Chen, and Shao-Yi Chien, Fast fingertip positioning by combining particle filtering with particle random diffusion, in *ICME*, pages 977-980, IEEE, 2008, a particle diffusion approach propagates particles starting from the center of the palm to positions close to the contour of skin-color segmented input images. Particle clusters identified are treated as fingertip candidates while particles close to the palm are ignored. Again, this works only for stretched fingers that do not point towards the sensor.

Accumulative Geodesic Extrema based on depth data are proposed by Christian Plagemann, Varun Ganapathi, Daphne Koller, and Sebastian Thrun, Real-time identification and localization of body parts from depth images, in *IEEE International Conference on Robotics and Automation (ICRA,* 2010). This approach assumes that the geodesic distance from the centroid of a body or a hand to its extremities is independent of the pose. Thus, starting at the centroid of an object, extremities are found by successively adding pixels that maximize their geodesic distance from this centroid.

The above method is optimized by Hui Liang, Junsong Yuan, and Daniel Thalmann, 3d fingertip and palm tracking in depth image sequences, in *Proceedings of the 20th ACM International Conference on Multimedia*, MM '12, pages 785-788, New York, N.Y., USA, 2012, ACM, by restricting the fingertip candidates a-priori to those positions where depth data becomes discontinuous. False positives are further reduced by adding a feature detector that measures the ratio of object vs. non-object pixels in a rectangular neighborhood around fingertip candidates. Particle filtering is used to track fingertips across multiple frames.

The method that is most likely implemented in the Kinect system and proposed by J. Shotton, A. Fitzgibbon, M. Cook, T. Sharp, M. Finocchio, R. Moore, A. Kip man, and A. Blake, Real-time human pose recognition in parts from single depth images, in *Proceedings of the* 2011 *IEEE Conference on Computer Vision and Pattern Recognition*, CVPR '11, pages 1297-1304, Washington, D.C., USA, 2011, IEEE Computer Society, is based on a large database of motion capture data. Here, a body part classifier is build from depth comparison features using randomized decision forests. However, this approach requires a large database and obtaining the decision trees took a day on a 1000 core cluster making it very hard to reproduce.

Other approaches use 3-dimensional models and project them into the image space.

One of the earliest works by Jim Rehg and Takeo Kanade, Digiteyes: Vision-based human hand tracking, Technical Report CMU-CS-93-220, Computer Science Department, Pittsburgh, Pa., December, 1993, uses a hand model where the fingers are cylinders. The direction of the central lines of each cylinder and their joints are estimated from a grey-scale image using a local operator. A non-linear least squares approach is used to estimate the pose of the hand. Fingertip positions are obtained by projecting the end points of the fingertip cylinders into the image space.

In Bjoern Stenger, Paulo R. S. Mendonça, and Roberto Cipolla, Model-based 3d tracking of an articulated hand, in *CVPR* (2), pages 310-315, IEEE Computer Society, 2001, the authors define a hand model with twenty seven degrees of freedom from thirty nine truncated quadrics. Contours are generated from the model and the model parameters are estimated using an unscented Kalman filter. In this case, fingertip positions are obtained by projecting the 3D positions of the fingertip quadrics into the image space.

In U.S. patent application Ser. No. 13/082,295 (US 2012-0113241), after skin based segmentation of RGB input images, fingertip candidates are identified as those contour points with highest curvature. Valleys in between the fingers are eliminated and ellipses are fit to the fingertip candidates.

A touchless pointing device is described in U.S. Pat. No. 8,907,894. Although the patent claims to process images for presence, location and velocity of objects the patent does not disclose a method that actually does extract the locations.

The same holds for U.S. patent application Ser. No. 13/907,925 (US 2013-0343607), where computer vision techniques such as shape recognition are applied for touchless control of a device. However, no details are given on how to apply these methods in a fast and robust way.

In U.S. Pat. No. 9,001,036, fingertips are identified as those pixels that changed in intensity from one image to the next and are much brighter than the surrounding pixels. Such a method will fail if extremities point towards the sensor or if they are close together.

Mathematical morphological filtering is applied in tracking method of three-dimensional finger motion locus based on stereo vision, Sep. 19, 2007, CN Patent App. CN 2007/10,039,941.

A combination of edge detection and depth data processing is used in U.S. Pat. No. 8,204,274. Corners of the object outline are treated as extremity candidates and depth information is used to validate the reliability of this estimate.

The present application is directed to improvements in extremity identification.

SUMMARY

As described herein, a method utilizes depth data to extract object extremities such as human fingertips, hands, arms, legs, and the head.

The following described herein is a method for identifying extremities of an object within a scene. The method comprises operating an image processing system to receive image data from a sensor. The image data represents an image of the scene with the object. The image data comprises a two-dimensional array of pixels and each pixel contains a depth value indicating distance from the sensor. The image processing system slices the image into slices. Each respective slice comprises those pixels with depth values that lie within a respective range of distances defined relative to a reference. For each of the slices, the method identifies one or more connected regions of pixels that are neighbors in the two-dimensional array of pixels. The method builds, based on the connected region of pixels that have been identified for the slices and depth information inherent to the respective slices, a graph consisting of interconnected nodes. The connected regions form the nodes of the graph and the nodes are interconnected in the graph based on their relative distance to the reference. Extremities of the object are determined based on the graph.

It is a feature that the determined extremities are each defined by a subset of pixels of the image data.

It is another feature to determine a center of gravity of a subset of pixels of the image data defining a respective extremity.

It is an additional feature to determine a bounding box for a subset of pixels of the image data defining a respective extremity.

It is a further feature that in determining the extremities, the leaf nodes of the graph starting from a common parent node are considered extremity candidates of the object within the scene. Determining the extremities comprises further steps performed for the leaf nodes of the graph. The steps include defining the pixels of a first node that is adjacent to the respective leaf node of the graph for which the pixels have minimum distance from the respective leaf node, determining whether the number of pixels of the first node and the leaf node is higher than a threshold number of pixels, and if not, adding to the extremity pixels the pixels of a second node adjacent to the leaf node of the graph for which the pixels have the second lowest distance from the respective leaf node so that the extremities are defined by the threshold number of pixels from the leaf node, the first node, and the second node adjacent to the leaf node in the graph.

The pixels of the first and the second node added to the respective extremity may be selected by growing a circular pattern starting from the center of the pixels of the leaf node.

It is another feature that the slices correspond to respective different ranges of distance relative to the reference. The width of the ranges may be equal for all slices or the width of the ranges may increase with increasing distance relative to the reference.

It is yet another feature that identifying, for each of the slices, the one or more connected regions of pixels of the two dimensional array of pixels further comprises enumerating the connected regions for the graph building in order to facilitate identification of the nodes of the graph. The connected region of pixels may be enumerated according to the respective slices they belong to and the respective slice's range of distance relative to the reference.

It is yet another feature that a first slice comprises those pixels which are in a first range of distances relative to the reference and a second slice comprises those pixels which are in a second range of distance relative to the reference. A maximum distance relative to the reference in the first range is a minimum distance relative to the reference in the second range. A first connected region of pixels in the first layer defining a first node of the graph is interconnected to a second node corresponding to a second connected region of pixels in the second slice, in case the pixels of the first connected region border on the pixels of the second connected region.

It is yet another feature that the method further comprises pruning the graph to simplify the graph. The pruning comprises one of the following methods, or combinations thereof. In case the graph building resulted in two or more independent graphs, pruning comprises removing the one or more graphs that contain less than a threshold number of nodes or that correspond to connected regions of pixels having less than a threshold number of pixels. Pruning may comprise merging a node corresponding to connected region of pixels of a size smaller than a threshold value with their respective parent node. In case a child node is connected to two parent nodes in the graph, pruning comprises merging the child node and the parent node corresponding to the smaller connected region of pixels into a single child node to the other of the parent nodes. In case two nodes at different relative distances to the reference in the graph are interconnected via interconnecting nodes in parallel paths of the graph, pruning comprises merging the interconnecting nodes in the parallel paths having the same relative distance to the reference point or plane into a single node. Pruning may comprise merging nodes at a same relative distance to the reference and corresponding to connected regions of pixels of a size smaller than a threshold value to a single node at said relative distance, in case they are connected to a common parent node in the graph. Pruning may comprise merging nodes at a same relative distance to the reference into a single node, in case the distance between their connected regions of pixels in the two-dimensional array of pixels or a three-dimensional space constructed from the two-dimensional array of pixels and the depth value is smaller than a threshold value.

It is an additional feature that the image data received from the sensor determines location of each point of the object in three-dimensional space.

It is yet an additional feature that the slicing of the image uses one of the following slicing methods: a sensor parallel planar slicing, in which the pixels of the image are divided in slices based on relative distance of the pixels to a reference plane spanning at the sensor's location and being perpendicular to the sensor orientation, wherein each of the slices comprises those pixels having a distance to the reference plane perpendicular to the sensor orientation that lies within a range of distances defined for the respective slice; a sensor centric spherical slicing, in which the pixels of the image are divided in slices based on the relative distance of the pixels to the sensor location serving as a reference point, wherein each of the slices comprises those pixels having a distance to the reference point that lies within a range of distances defined for the respective slice; an object planar slicing, in which the pixels of the image are divided in slices based on the relative distance of the pixels to a reference plane within the scene, wherein each of the slices comprises those pixels having a distance to the reference plane that lies within a range of distances defined for the respective slice, or an object centric spherical slicing, in which the pixels of the image are divided in slices based on the relative distance of the pixels to a given reference point, wherein each of the slices comprises those pixels having a distance to a reference point that lies within a range of distances defined for the respective slice.

It is yet an additional feature that the slicing method used for slicing the image is selected responsive to user input.

The approaches described herein are based on slicing the depth image; building a graph based on the connectivity of the points in the different slices; and determining features such as fingertips by graph traversal. This approach is further extended by filtering and tracking methods to increase robustness. The slicing can compensate for noise in the depth data and the slice width may be adjusted according to the different noise levels of the sensor. The traces of the tracked extremities in space and time are used to estimate body and hand motion and behavior and to recognize gestures.

The method has at least two advantages with regard to existing methods. First, it does not require a specific sensor orientation but may be tuned to any relative position of sensor and object. Second, it comprises two computation phases that are designed to be extremely fast and to run on embedded hardware: the first phase is pixel based and the computational effort depends on the size of the input image while the second phase is graph based and depends only on the complexity of the object. The pixel-based operations involve simple mathematical calculations and may therefore be optimized in software easily but may also be executed on dedicated imaging hardware and in parallel. The computational complexity of the graph-based operations is even lower.

Further features and advantages will be readily apparent from the specification and from the drawings.

DETAILED DESCRIPTION

A method is disclosed herein for identifying extremities of an object within a scene and for the fast and robust tracking of extremities.

Figure 1:
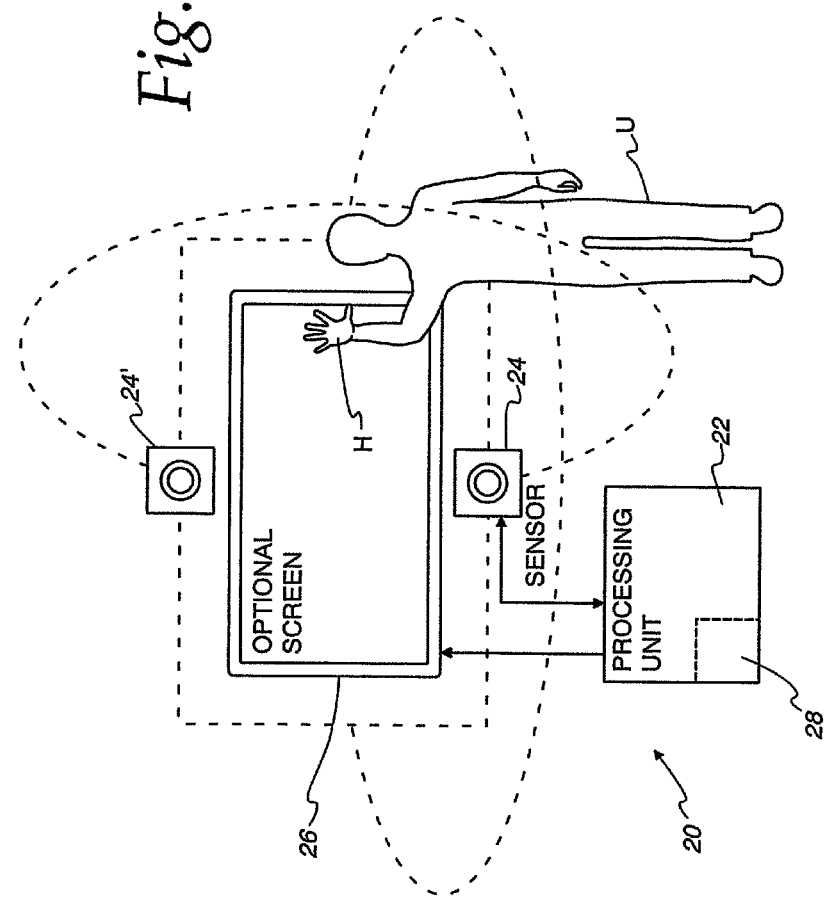
FIG. 1 is a block diagram illustrating a system for identifying extremities of an object within a scene, as described herein.

In an illustrative embodiment, as shown in FIG. 1, an image processing system 20 is used for identifying extremities of an object. The system 20 includes a processing unit 22 and a sensor 24 connected to the processing unit 22. The sensor 24 comprises a three-dimensional (3D) sensor. An optional display screen 26 may also be connected to the processing unit 22. The display screen 26 may illustrate the identified extremities in any desired form, such as in the playing of a game, or the like, or be a general computer display with the extremities used for controlling a cursor or the like. A typical application is an automotive scenario to control the various apparatus in the vehicle, but the method described herein is not limited to any particular application for the use of the identified extremities. The sensor 24 can be mounted in any desired orientation such as that shown. The sensor 24 can be an off-the-shelf sensor or a special purpose sensor. Moreover, the processing unit 22 may be connected to multiple sensors, such as the sensor 24 and a second sensor 24', as well as additional sensors, not shown.

The processing unit 22 comprises a programmed processor, such as a personal computer, server, or the like, operating in accordance with a custom program stored in memory 28, as described below. The memory 28 may be internal memory and/or external memory, such as RAM, ROM, hard drives, optical drives, servers, or related to further processors. The system 20 shown herein is not intended to be limited to any particular hardware configuration, as the methodology implemented by the system 20 may be implemented on numerous different configurations.

In an illustrative example, a user U is positioned proximate the sensor 24. The sensor 24 is operable to capture image data in a scene. The scene is defined by the surroundings in view of the sensor 24. The system 20 is adapted to identify extremities of an object, such as a user's hand H, the extremities being the tips of the fingers of the hand H.

As described herein, the method for identifying extremities of an object within a scene comprises operating the image processing system 20, using the processing unit 22, to receive image data from the sensor 24. The image data represents an image of the scene with the object. The image data comprises a two-dimensional array of pixels and each pixel contains a depth value indicating distance from the sensor 24. The image processing system 20 slices the image into slices. Each respective slice comprises those pixels with depth values that lie within a respective range of distances defined relative to a reference. The image processing system 20 identifies, for each of the slices, one or more connected regions of pixels that are neighbors in the two-dimensional array of pixels. The image processing system 20 builds, based on the connected regions of pixels that have been identified for the slices and depth information inherent to the respective slices, a graph consisting of interconnected nodes. The connected regions form the nodes of the graph and the nodes are interconnected in the graph based on the relative distance to the reference. The image processing system determines extremities of the object based on the graph.

The programmed processing unit 22 uses data provided by the 3D sensor 24, which may also be referred to as a 3D camera or range sensor. The data provided by the sensor 24 is called range data or depth data.

The sensor 24 has pixels that lie in the image plane and are indexed with indices (i, j). For each pixel (i, j) the sensor 24 provides a range value (distance to the object) zi,j that represents the distance from the pixel to the imaged 3D point in the 3D space in front of the sensor 24. In a coordinate frame with (x, y) axes lying in the image plane (centered at the intersection of the image plane with the optical axes), the 3D point that has been sensed has coordinates (x, y, z) and can be represented as a vector vi,j=(xi,j, yi,j, zi,j). Different types of 3D sensors 24 exist. They are based on different methods that can be used to acquire range data. The first distinction is between direct methods and indirect methods. The most important direct method is to measure the time light needs to travel from the light source to the object and back to the sensor; these sensors are called time-of-flight-sensors or ToF sensors. The time can be measured either by sending a pulse of light or by modulating the light source and measuring the phase shift between emitted and reflected light.

Most indirect methods are based on triangulation, meaning that a 3D point on the object is illuminated and/or imaged from different known viewpoints, which, together with the 3D point, define a triangle from which the distance to the 3D point can be determined. This method is used in different kinds of sensors. One known sensor uses an infrared-light projector and a camera at different positions. The classical approach is to use two or more cameras, with the benefit that no additional light source is required, although sometimes additional light sources are used.

The different sensors differ in the precision by which they can measure range but they also differ in terms of how many 3D data points they can provide. A ToF sensor can measure range as long as the object reflects sufficient light, whereas a stereo system requires that the object has some structure that can be matched in the two (or more) images.

The method described herein will work with any 3D sensor, as long as it provides a sufficiently dense cloud of 3D points.

The disclosed method first slices the space in front of the sensor 24 according to different principles and depending on different applications as described below. Each available 3D data point is assigned to its corresponding slice in space. The assignment is refined depending on whether the points are connected (neighbors in the image plane (i, j) when projected there). Then, using connectivity between groups of points that lie in different slices, the method builds a graph. Finally, the leaves of the graph are defined as extremities that should correspond to features such as the finger tips of a hand H.

Figure 2:
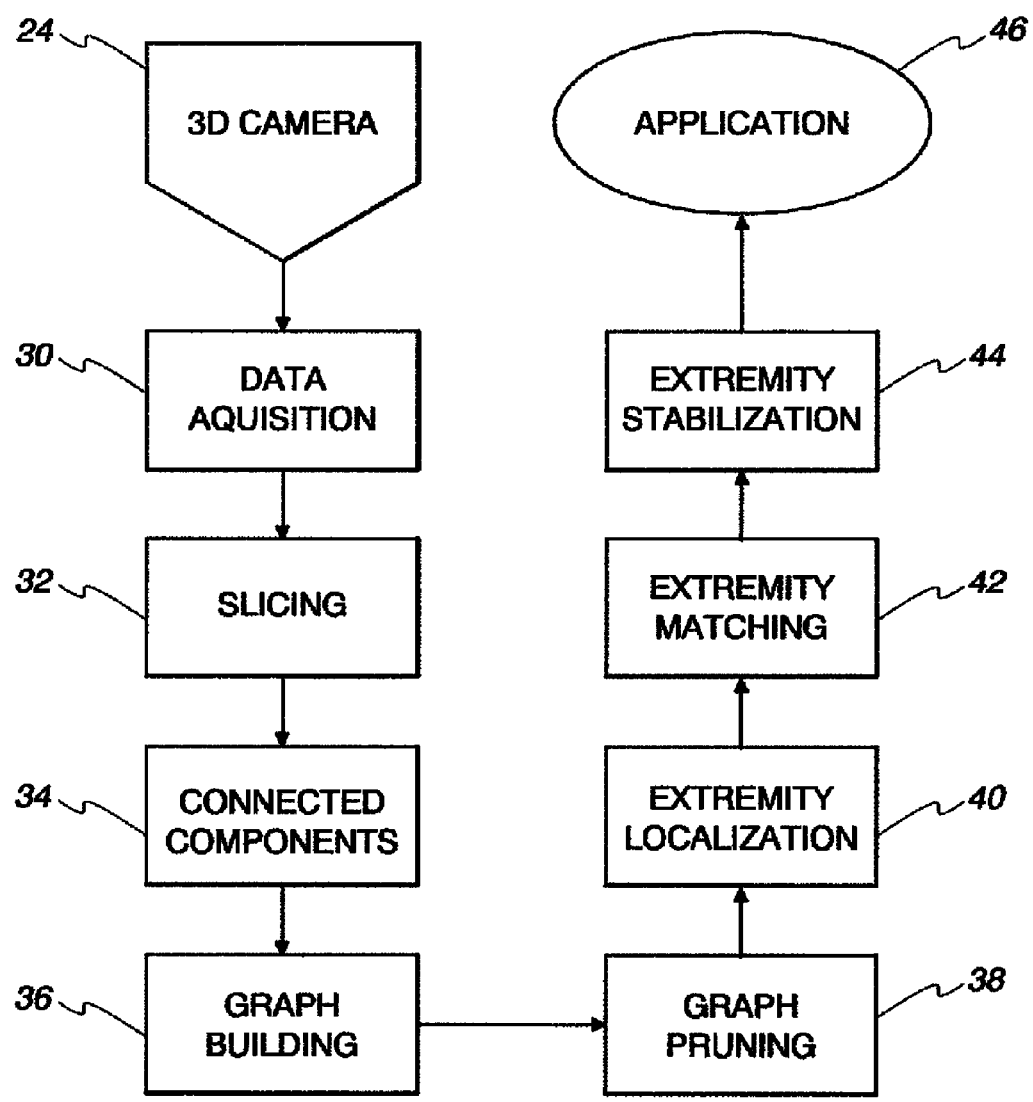
FIG. 2 is a flow chart of an overview of a method for identifying extremities of an object within a scene implemented by the system of FIG. 1.

The method uses eight basic steps as illustrated in the flowchart of FIG. 2. Particularly, the flow chart of FIG. 2 illustrates the basic algorithm implemented in the processing unit 22 for identifying extremities of an object using image data from the image sensor 24. The process begins with data acquisition at a block 30. This comprises acquiring the image data from the sensor 24. ASA discussed above, the image data comprises a 2D array of pixels each containing a depth value. The depth data slicing is implemented at a block 32 which divides the image into slices of a certain width. Connected component enumeration is implemented at a block 34. From the connected component enumeration, a graph is built at a block 36. The graph is then pruned at a block 38. A block 40 implements an extremity localization routine. This relates to tracking of extremities over time. Extremity identifier matching is implemented at a block 42. Extremity stabilization is implemented at a block 44. Finally, the identified extremity data is provided to an application at a node 46 for further use, such as the playing of a game, or the like.

Each of the blocks of the flow diagram of FIG. 2 is described in greater detail below.

The data acquisition implemented at the block 30 comprises the acquisition of depth data. The program assumes that for every pixel location (i,j) a three-dimensional vector vi,j=(xi,j, yi,j, zi,j) with the corresponding horizontal, vertical and distance information for the pixel at that location is available, as discussed above. In some cases a secondary image (e.g., amplitude, intensity or RGB) may be acquired that is properly registered with the depth image, i.e., a pixel in the depth image captures the same 3D point as the corresponding pixel in the secondary image. Some appropriate sensors do deliver such data by default (e.g., ToF sensors); for other sensors there exist methods to register two images (e.g., for structured light sensors that have a second non-depth image sensor attached or stereo sensors).

The depth data slicing block 32 divides the image into slices of a certain width. The slice width may either be equidistant for all slices or the program may adapt the distance to the noise level of the sensor (e.g., increase the width with increasing distance). Such slicing is essentially different from object segmentation, a step that is frequently done on depth data. Object segmentation delivers just one segment for each object while the disclosed slicing method delivers multiple slices per object and can thus capture the intrinsic structure of the object. The slicing variants are selected depending on the particular application and are illustrated in FIGS. 3A, 3B, 3C and 3D.

Figure 3A:
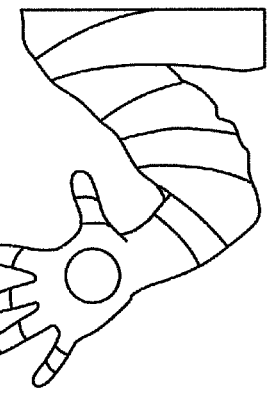
FIGS. 3 A, 3B, 3C and 3D, illustrate different slicing methods used in the method of FIG. 2.

A first slicing method is sensor parallel planar slicing. A schematic example is shown in FIG. 3A. In a typical use case, the program identifies extremities that point towards the sensor plane and uses them to mimic the functionality of a planar depth-sensitive touch screen. Therefore, the space in front of the sensor is divided into planar parallel slices, divided by parallel planes, starting at the sensor plane itself (distance zero). Given a sequence of such planes at increasing distances $d=d_0, d_1, \ldots$ (e.g., $d_0=0$ cm, $d_1=1$ cm), a slice $S_k$ contains all pixels that have a distance within the interval between two neighboring planes:

$$S_k=\{(i,j)|d_k \leq z_{i,j} < d_{k+1}\}.$$

Although the slicing is defined by planes, the resulting contours on the hands may look curved, depending on the viewpoint, because the surface of the hand is curved.

Figure 3B:
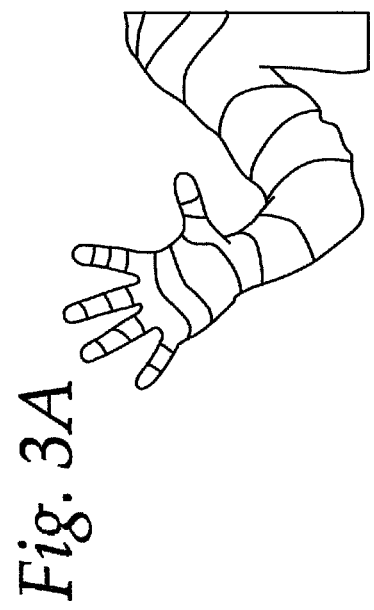

A second slicing method is sensor centric spherical slicing. A schematic example is shown in FIG. 3B. In this case, the system identifies extremities that point towards the sensors origin, i.e., mimicking a depth sensitive spherical touch screen. Here, the space is sliced with spherical surfaces, which are centered at the center of the sensor plane and defined by their distance to the center of the sensor plane and sort the pixels into the different slices according to:

$$S_k=\{(i,j)|d_k \leq \sqrt{x_{i,j}^2+y_{i,j}^2+z_{i,j}^2} < d_{k+1}\}$$

Figure 3C:
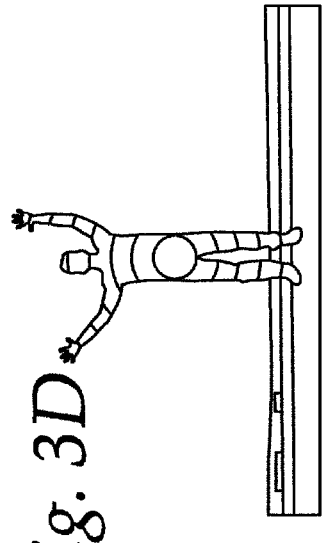

A third slicing method is object specific planar slicing. A schematic example is shown in FIG. 3C. In this use case, the system identifies extremities with respect to a certain plane in the scene, e.g. arms or heads of persons standing on a flat ground. This can, for example, result in a vertical slicing scheme defined by:

$$S_k=\{(i,j)|d_k \leq y_{i,j} < d_{k+1}\}.$$

Figure 3D:
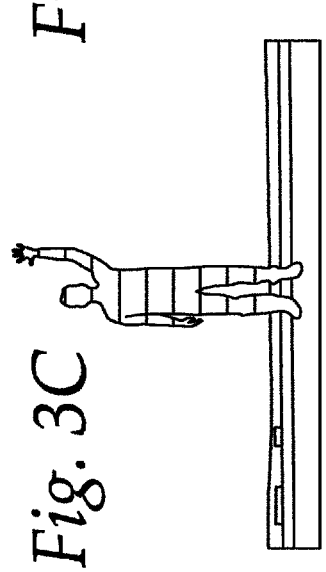

A fourth slicing method is object specific spherical slicing. A schematic example is shown in FIG. 3D for body slicing relative to the torso as the specific feature. In this method, the system identifies extremities with respect to a specific point in space, which is usually defined by an object feature such as the wrist or the torso. The system can localize the fingertips as structures that point away from the wrist and the arms as pointing away from the torso. Such a slicing scheme is then defined by an object specific feature located at $(x'_{ij}, y'_{ij}, z'_{ij})$, which then defines the slice $S_k$ to contain those pixels for which $$S_k=\{(i,j)|d_k \leq \sqrt{(x_{i,j}-x'_{i,j})^2+(y_{i,j}-y'_{i,j})^2+(z_{i,j}-z'_{i,j})^2} < d_{k+1}\}$$

In the most general case, the depth data may be sliced in a very specific and application-tuned manner such that the slicing allows the system to capture the intrinsic structure of the object for that particular application. For example, if an application needs a cubic surface of interaction one can define an appropriate cubic slicing scheme. Furthermore, one could use local estimates of the noise level to adjust the width of the slice locally according to the locally estimated noise level. Moreover, besides the Euclidian distance measure used in the above slicing methods, the geodesic distance measure may be used as well.

The connected component enumeration of the block 34 is now described. As a result of the slicing procedure (any of those described above) all pixels belonging to the same slice have the same label (defined by the index k to a particular slice) but do not necessarily belong to the same physical object (e.g., neighboring fingertips might have the same depth and therefore the same label but belong to different fingers, see FIG. 4).

Figure 5:
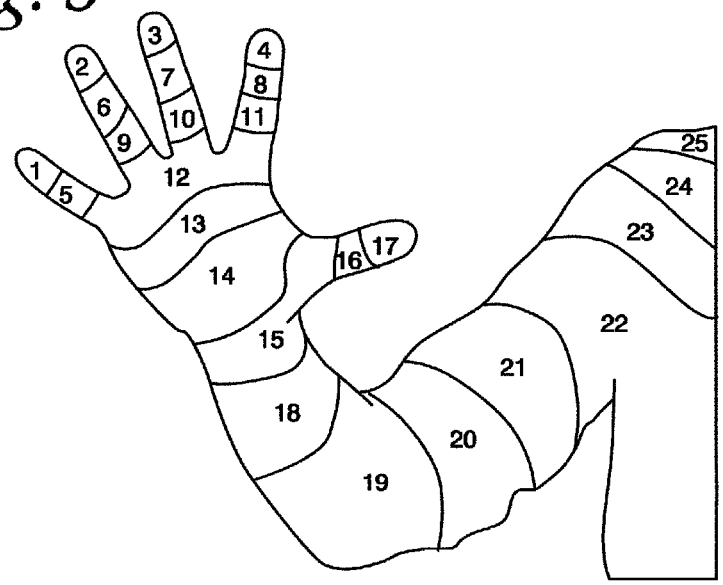
FIG. 5 illustrates connected component enumeration implemented by the method of FIG. 2.

The system proceeds to identify connected components and re-label the segments such that only pixels within a connected component receive the same label (see FIG. 5). The system can start with any pixel in a particular slice and then assign a label to all the pixels that are connected to the original pixel. The system then selects a not-yet-labeled pixel from the same slice, repeat the procedure and assign a new label to the connected pixels. Once all the pixels in a slice have been labeled, then the system moves to the next slice.

Figure 4:
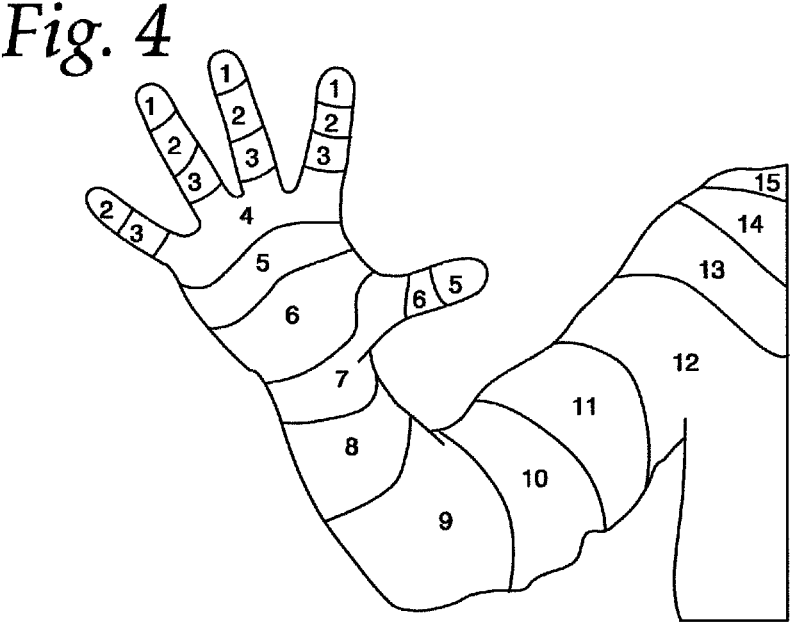
FIG. 4 illustrates an example of slicing of an object.

For example, FIG. 4 illustrates use of the sensor parallel planar slicing, described above relative to FIG. 3A, with portions of the user within the image being labeled according to the particular slice. As a result of this, the finger tips of three fingers are labeled with numeral 1, while the tip of the pinky finger is labeled with numeral 2 and that of the thumb with numeral 5. With the enumeration of connected components, the connecting components are re-labeled so that the four finger tips, which are extremities of different fingers, are now labeled with numerals 1, 2, 3 and 4 and relevant connected components re-labeled, as shown in FIG. 5 relative to FIG. 4.

Depending on the raw data quality, a four-connected neighborhood (faster) or an eight-connected neighborhood (slower but more robust) or any other algorithm that uniquely assigns labels to connected components may be used.

The graph building routine of the block 36 of FIG. 2 is now described. As a first approximation towards the real object structure, the system builds a directed graph from the labeled segments of FIG. 5. For each group of pixels with a particular label, the system creates a node. All nodes A and B are connected by a directed edge from A to B if the corresponding components in the sliced image are connected and if the original slice labels kA and kB (before assigning connected-component labels) fulfill $$k_A = k_B + 1$$

Note that the graph is acyclic by definition. In the previous step, the system was analyzing the connectivity of pixels, i.e., of 3D points projected on the image plane. It is now looking at the connectivity of nodes, which are groups of pixels that have received the same label. However, whether two nodes are connected depends again on whether one node contains a pixel that is connected to a pixel from the other node (besides the labeling condition above).

By analyzing the graph (the algorithm is called graph traversal), the system is able to identify leaves of the graph. A leaf is a node with no "children", as is known. Ideally, each leaf should correspond to an extremity of the sliced objects. However, this assumption is not always valid since problems might be caused by various factors. Due to noise in the range measurement, points which are adjacent on an object may differ significantly in their pixel coordinates and may therefore be erroneously assigned to different slices. Sometimes certain parts of an object might be projected such that features which are not extremities in 3D space become extremities in the 2D projection and thus become a leaf in the graph (e.g. the ball of the thumb might become a leaf if the hand is oriented such that the tip is not visible).

Figure 7:
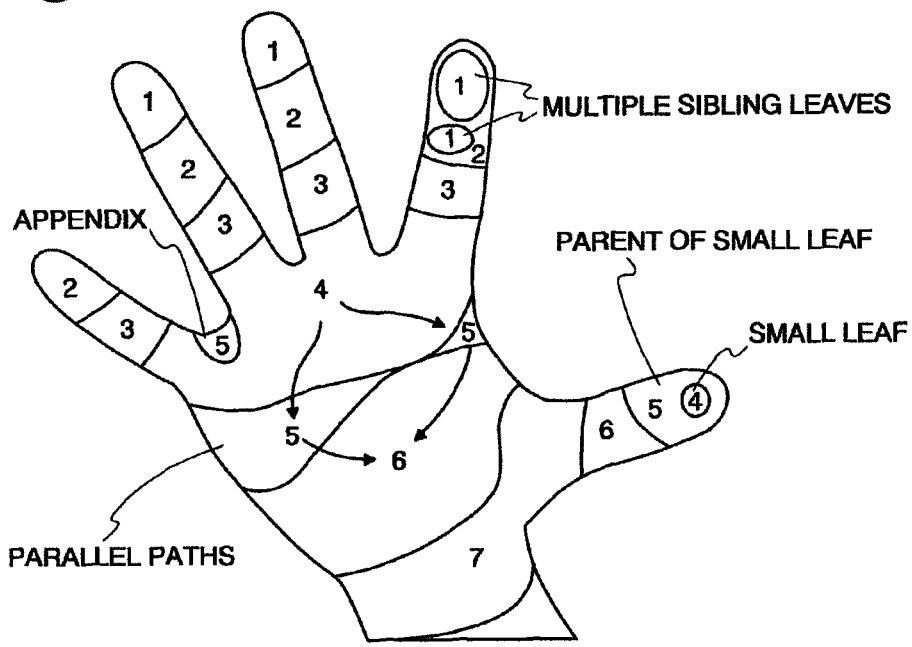
FIG. 7 illustrates the result of slicing with imperfect data.
Figure 8:
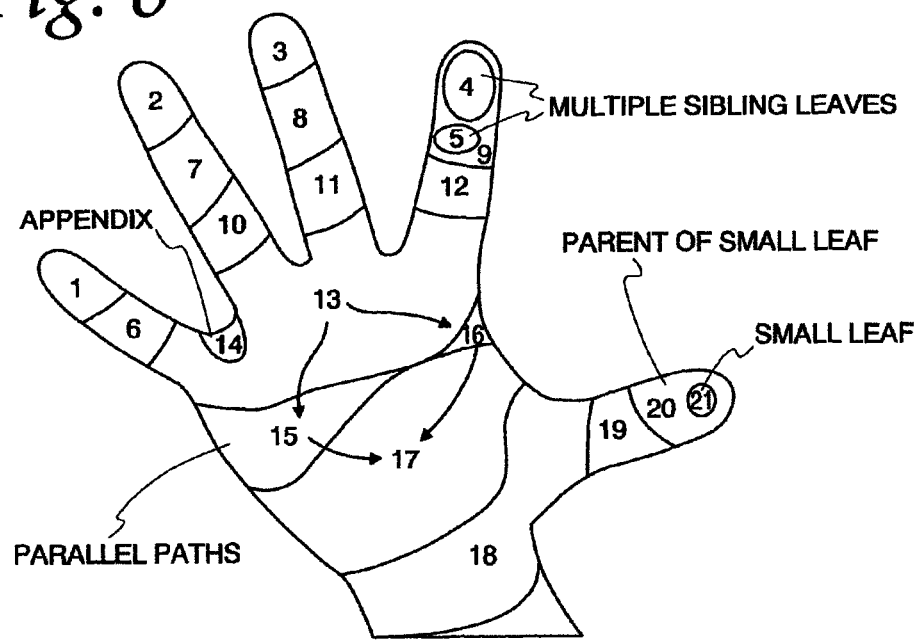
FIG. 8 illustrates the results of connected component enumeration with imperfect data.

The graph pruning of the block 38 of FIG. 2 simplifies the graph and converts it to a tree that better represents the intrinsic structure of the object by removing implausible graph structures, as shown in FIGS. 7 and 8. To that end, the system applies the following modifications and extensions.

The pruning comprises at least one of several pruning methods. As will be apparent, only one pruning method may be used or multiple of the pruning methods may be used, as desired. In case the graph building resulted in two or more independent graphs, pruning comprises removing the one or more graphs that contain less than a threshold number of nodes or that correspond to connected regions of pixels having less than a threshold number of pixels. Pruning may comprise merging a node corresponding to connected region of pixels of a size smaller than a threshold value with their respective parent node. In case a child node is connected to two parent nodes in the graph, pruning comprises merging the child node and the parent node corresponding to the smaller connected region of pixels into a single child node to the other of the parent nodes. In case two nodes at different relative distances to the reference in the graph are interconnected via interconnecting nodes in parallel paths of the graph, pruning comprises merging the interconnecting nodes in the parallel paths having the same relative distance to the reference point or plane into a single node. Pruning may comprise merging nodes at a same relative distance to the reference and corresponding to connected regions of pixels of a size smaller than a threshold value to a single node at said relative distance, in case they are connected to a common parent node in the graph. Pruning may comprise merging nodes at a same relative distance to the reference into a single node, in case the distance between their connected regions of pixels in the two-dimensional array of pixels or a three-dimensional space constructed from the two-dimensional array of pixels and the depth value is smaller than a threshold value.

More particularly, the system implements the removal of small graphs. All graphs that contain less than a particular number of nodes or cover less than a particular number of pixels are discarded as such graphs do not contain enough information to allow robust tracking. This step also eliminates all isolated nodes that might occur due to noise artifacts. The system implements the merging of small leaves with their parent. All leaves that are smaller than a particular threshold are merged with their parent nodes.

The system implements the merging of appendices with their child. If a child node is connected to two parent nodes the smaller parent node (and possibly further nodes attached to that parent node) is merged with the child node. The system implements the merging of parallel paths with their siblings. For all parallel path ways the nodes on the same level are merged. The system implements the merging of sibling leaves. Multiple leaves of the same parent node are merged into one node if they are smaller than a particular threshold. The system implements the merging of proximate nodes. Nodes that are close together either according to image space coordinates or real-world coordinates are merged. Again, appropriate distance measures include but are not limited to the Euclidian distance and the geodesic distance.

All graph pruning methods aim to simplify the graph and make it more consistent such that it finally captures only the intrinsic topology of the object.

Figure 10:
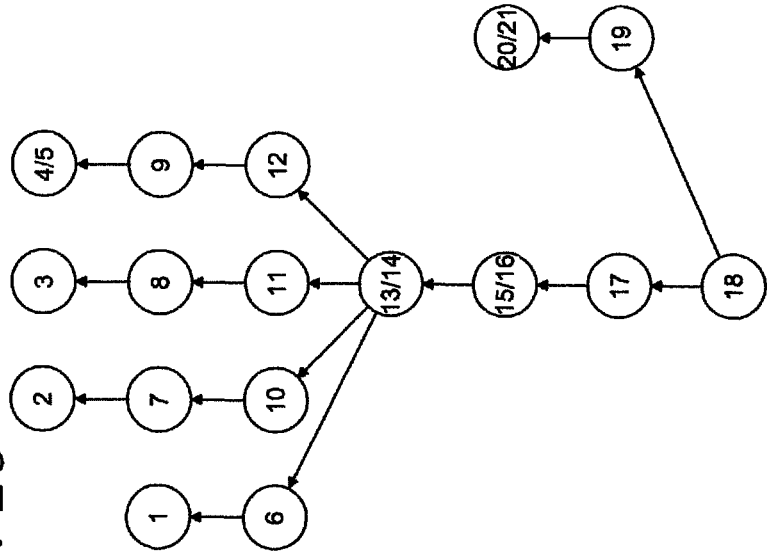
FIG. 10 illustrates the exemplary graph of FIG. 9 after pruning of the graph.
Figure 9:
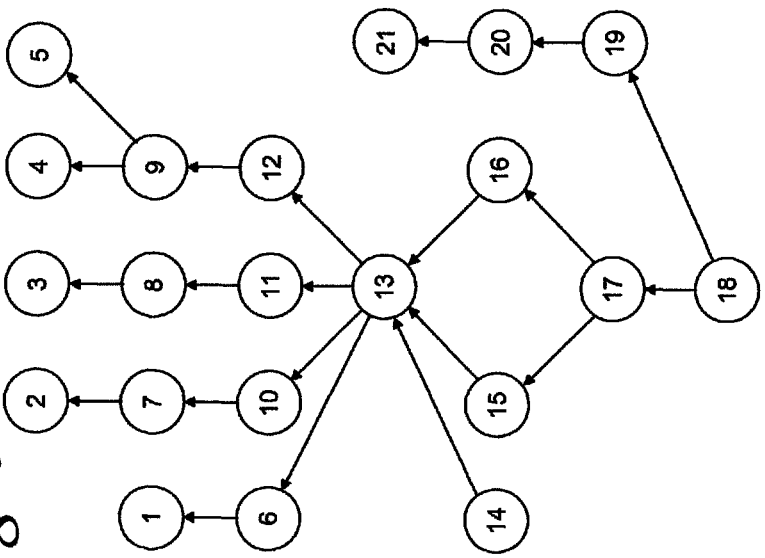
FIG. 9 illustrates an exemplary graph before pruning.

In case of the example with the real data, the rather complex graph shown in FIG. 9 which corresponds to the connected component enumeration of FIG. 8 is simplified to the graph shown in FIG. 10.

The extremity localization of the block 40 of FIG. 2 is now described. The scope of the steps described so far is to deliver a consistent tree of which the leaves indicate good candidates for body extremities such as the finger tips. Each leaf corresponds to a connected component of pixels in the image space. However, all the computational steps of building the tree and detecting the leaves are based on processing single frames without taking into account previous or subsequent frames. The problem of tracking the extremities over time, i.e., of finding the corresponding extremities over a sequence of frames, is now addressed.

Figure 6:
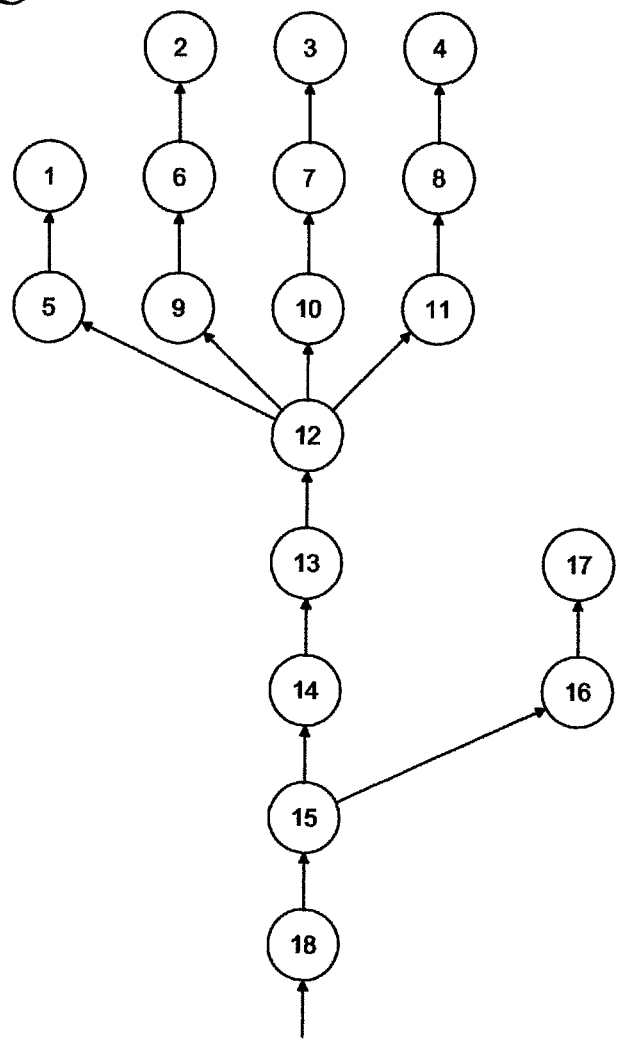
FIG. 6 illustrates an exemplary graph resulting from the connected component to numeration of FIG. 5.

To that end, the system first extracts appropriate high-level features from the extremity candidates, features to be used as input for an extremity tracker in the next step. Such features may include but are not limited to: the number of pixels in the connected component; the center of gravity, or other moments, of the connected component; and a bounding box around the connected component. However, the extremity localization will be more robust if the system uses not only the leaf but a larger area of connected components that includes the nodes up to the next bifurcation (for example in FIG. 6 the nodes 4, 8 and 11 could be used for a more robust identification of the fingertip location).

Figure 11:
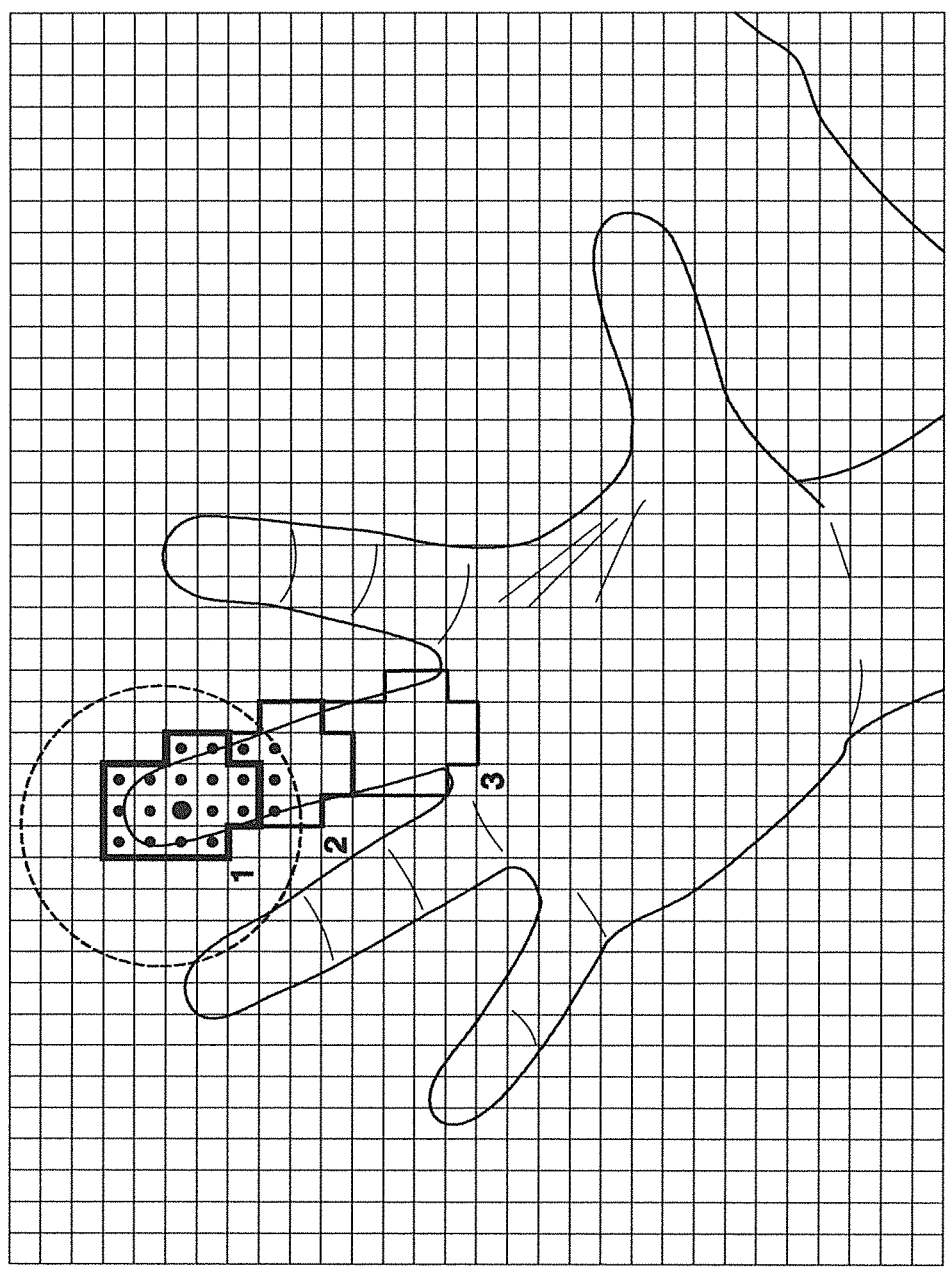
FIG. 11 illustrates an example of circular filling implemented using the method of FIG. 2.

To obtain such a larger area, the system first identifies the nodes that are linked with a particular leaf. Then, the system treats the pixels of these nodes as a single object and grows a predefined number of pixels in a circular pattern starting from the center of the leaf (see FIG. 11 for an example). As a result, all extremities will be represented by exactly the same number of pixels and will therefore have the same stability behavior. Otherwise, when moving vertically with respect to the slices the shape and extent of the extremity leaf could change and result in unbalanced extremities.

Figure 12:
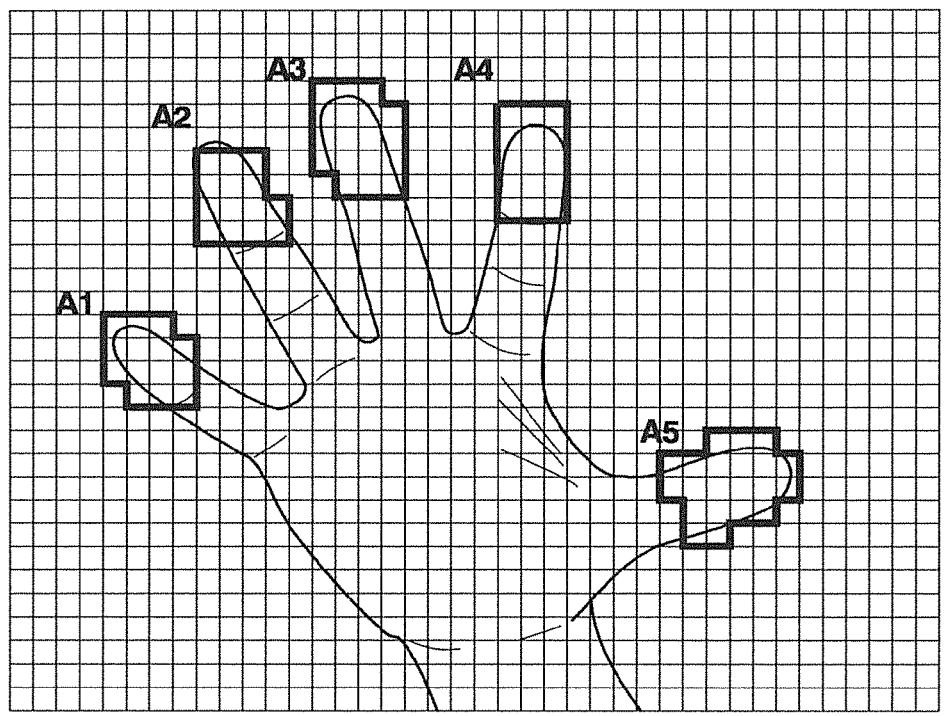
FIGS. 12 and 13 illustrate extremity identifier matching implemented by the method of FIG. 2.
Figure 13:
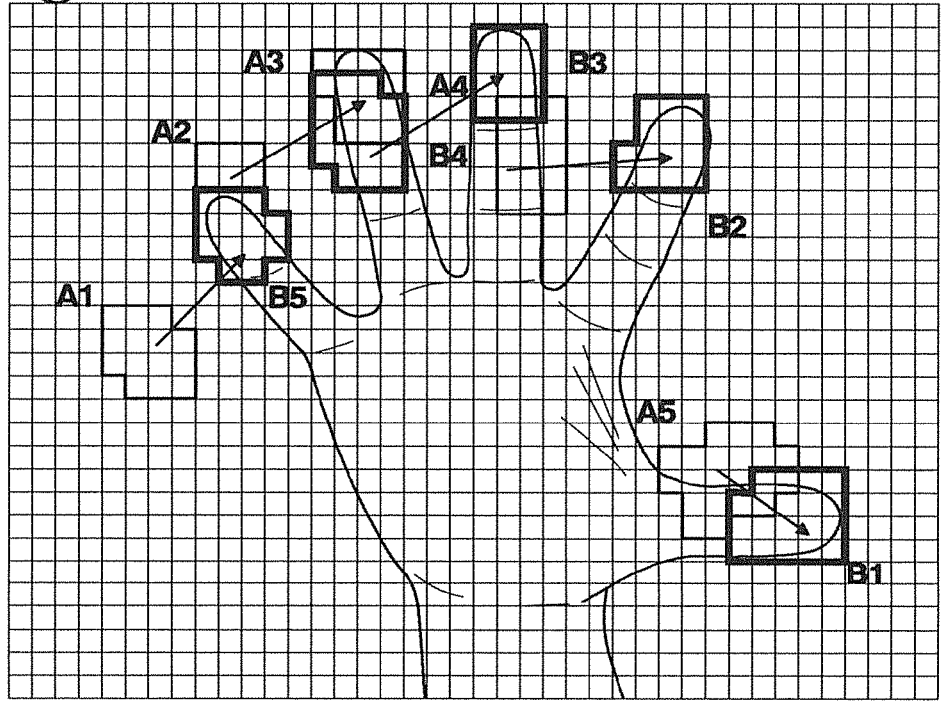

The extremity identifier matching of the block 42 of FIG. 2 is now discussed. Each node in the graph has a unique identifier but as graphs in two successive images may differ in structure the identifiers may not necessarily be the same after slicing, graph building, and graph pruning. Therefore, the system matches the identifiers in successive images based on the features extracted in the previous step (e.g., center of gravity, bounding box) such that a once detected extremity is assigned the same identifier across a sequence of frames. The identifiers can be matched using any algorithm that minimizes the total sum of distances from the newly detected extremity identifiers to the old identifiers while allowing identifiers to appear and disappear when no proximity candidate is found. For example, FIG. 12 shows that in one image the extremities are labeled A1, A2, A3, A4 and A5. In a successive image, see FIG. 13, after there has been some movement of the hand, then the same extremities are labeled B5, B4, B3, B2 and B1. The system uses a matching algorithm, as described, and changes the identifier of B5 to A1, B4 to A2, B3 to A3, B2 to A4 and B1 to A5.

The extremity stabilization of the block 44 of FIG. 2 is now discussed. The obtained extremity location may now be directly used, e.g., to control a mouse cursor. However, in most cases a further stabilization needs to be done. It should be noted that stabilization using only standard smoothing techniques such as temporal averaging would provide smooth motion vectors, but would also introduce temporal latencies.

Figure 14A:
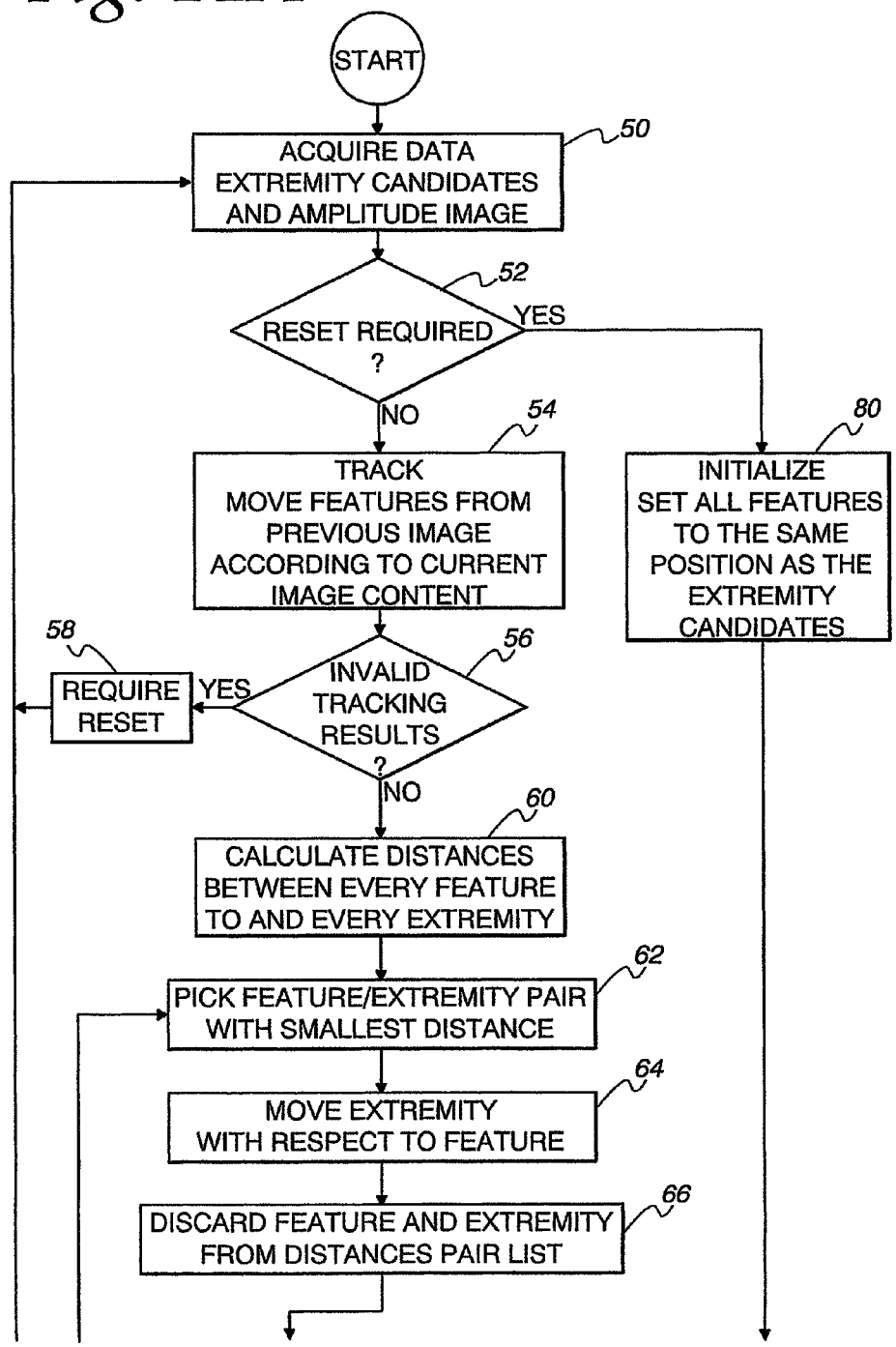
FIGS. 14A and 14B are a more detailed flow diagram illustrating tracking of extremities with depth data using the extremity identification described relative to FIG. 2.
Figure 14B:
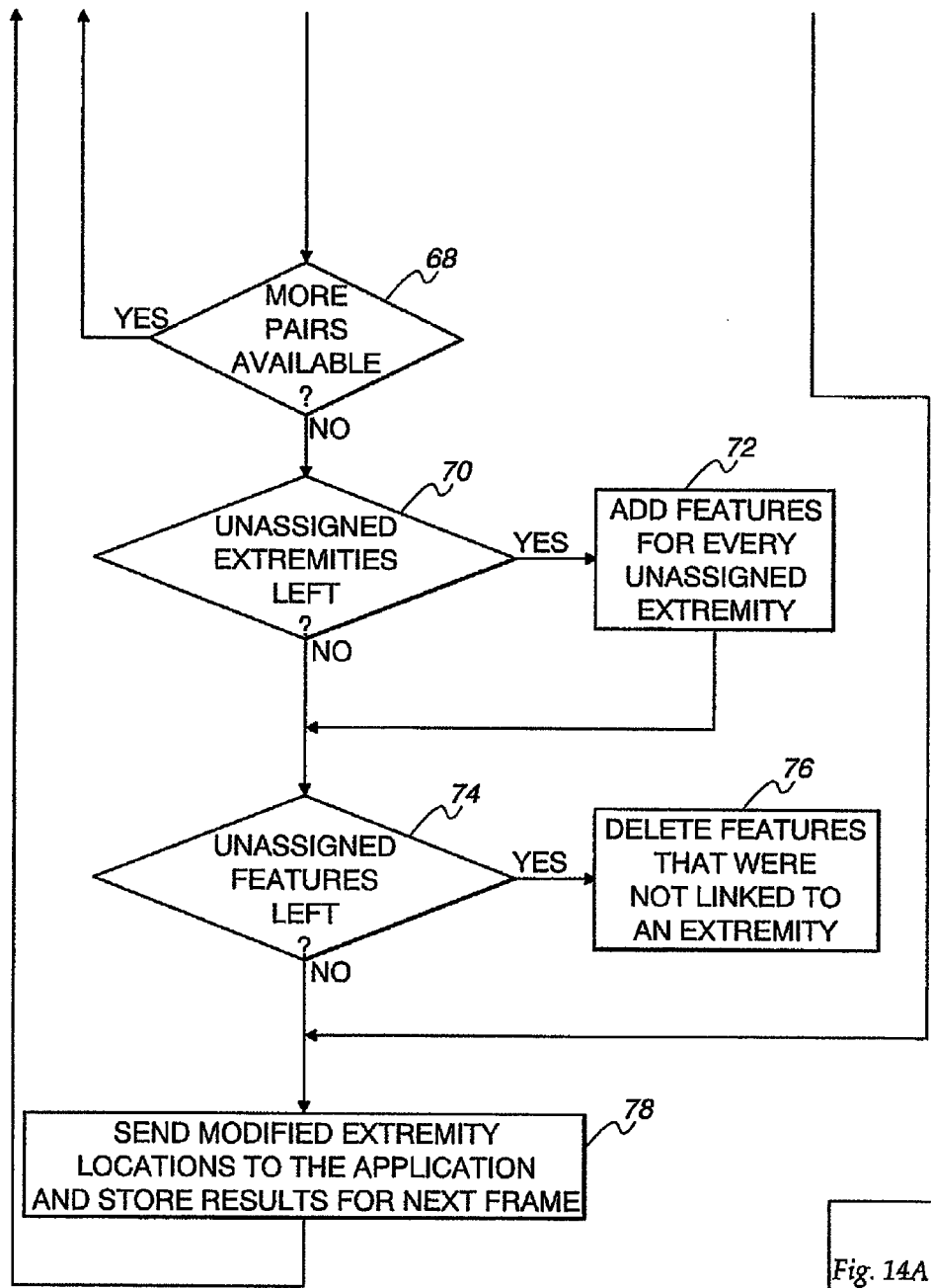

The system stabilizes the extremity location using a tracking method as it can offer better (sub-pixel) accuracy and a better user experience when scaling the result from camera resolution to a screen or interface. This may either be done on the depth image or a secondary image (e.g., amplitude, intensity, RGB). In general, however, the depth image exhibits more imaging artifacts and noise especially at the image borders and for larger distances. Thus, tracking on the amplitude image may be favored. A detailed flow chart is shown in FIGS. 14A and 14B.

The flow chart begins at a block 50 which acquires data. This uses the methodology discussed above with respect to an image to identify the extremities of the object. A decision block 52 determines if reset is required. A reset may be required, for example, upon start-up or when the tracked features all converge to the same spot or position. If a reset is not required, then the system moves to a track block 54. The track block 54 moves features from a previous image according to the current image content, as discussed above relative to FIGS. 12 and 13. The tracking step may involve any suitable tracking method, e.g., block-based methods or optical flow estimation with the Lucas-Kanade method.

A decision block 56 checks for invalid tracking results. Tracking results are treated as invalid if features are too close together or if a confidence value provided by the tracker indicates invalid results. If so, then a reset is required at a block 58 and the program then loops back to the block 50 and a reset is subsequently implemented via the decision block 52.

If the tracking results are not invalid, then the program advances to a calculate distances block 60. This calculates distances between every feature to and every extremity. For simplicity and stability, the 2D Euclidian distance measure should be chosen. Other distance measures might be suitable as well, e.g., the Euclidian distance in the 3D space. However, this requires projecting the 2D coordinates (that might not necessarily be located on the pixel grid but in between pixels) of the detection step into 3D space.

A block 62 then picks the feature/extremity pair with smallest distance that is closer than a threshold distance (e.g., to avoid matching a feature whose corresponding extremity has disappeared to another extremity that has just been detected).

A block 64 moves extremities with respect to the selected feature. This step involves deriving a distance dependent weight vector to trade off latency and smoothness. Small changes of a feature or an extremity coordinate should not lead to jitter but must be completely stable while larger changes should immediately lead to updates. The weight may be calculated as:

$$\alpha = \frac{1}{1 + \left(\frac{\Delta}{f}\right)^2}$$

where $\Delta$ is the distance between feature coordinate xf and extremity coordinate xe. f describes a resolution and field-of-view-dependent scaling factor. Other weighting functions that downweight small distances and upweight larger distances are applicable as well (e.g. exponential filtering or Kalman filtering). The extremity coordinate is finally updated to $$x_e = \alpha \cdot x_f + (1-\alpha) \cdot x_e$$

A block 66 discards features and extremities from the distances pair list. A decision block 68 determines if more pairs are available. The above steps are repeated until either no feature or no extremity candidate is left or the remaining pairs exceed certain thresholds. For every unassigned extremity a new feature is introduced and initialized with the extremity coordinate. Every unassigned feature is deleted or can be tracked until a time-to-live counter expires, or a new extremity is detected nearby, when it should be assigned to it. If more pairs are available, then the program loops back to the block 62. If not, then a decision block 70 determines if there are unassigned extremities left. If so, then a block 72 adds features for every unassigned extremity. Thereafter, or if there are no unassigned extremities left, then a decision block 74 determines if there are unassigned features left. If so, then a block 76 deletes features that were not linked to an extremity. Thereafter, or if there were no unassigned features left, then the program proceeds to a block 78 which sends the modified extremity locations to the application and stores the results for the next frame. The program then loops back to the block 50.

If a reset is required, as determined at the block 52, then a block 80 implements an initialization routine which sets all features to the same position as the extremity candidates. The program then advances to the block 78 and supplies the reset values to the application and then returns to the acquire data block 50 to begin again.

Thus, as described herein, a method utilizes depth data to extract object extremities such as human fingertips, hands, arms, legs, and the head for fast and robust identification of extremities of an object within a scene.

The present system and method have been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions. None of the methods according to various aspects disclosed herein is limited to performing the steps thereof in any particular order.

We claim:

1. A method for identifying extremities of an object within a scene, the method comprising:
   operating an image processing system to receive image data from a sensor, the image data representing an image of the scene with the object, wherein said image data comprises a two-dimensional array of pixels and each pixel contains a depth value indicating distance from the sensor;
   the image processing system slicing the image into slices, wherein each respective slice comprises those pixels with depth values that lie within a respective range of distances defined relative to a reference;
   Identifying, for each of the slices, one or more connected regions of pixels that are neighbors in the two-dimensional array of pixels;
   building, based on the connected regions of pixels that have been identified for the slices and depth information inherent to the respective slices, a graph consisting of interconnected nodes, wherein the connected regions form the nodes of the graph and the nodes are interconnected in the graph based on their relative distance to said reference; and
   determining extremities of the object based on the graph.

2. The method according to claim 1, wherein the determined extremities are each defined by a subset of pixels of the image data.

3. The method according to claim 1, further comprising determining a center of gravity of a subset of pixels of the image data defining a respective extremity.

4. The method according to claim 1, further comprising determining a bounding box for a subset of pixels of the image data defining a respective extremity.

5. The method according to claim 2, wherein in determining the extremities, leaf nodes of the graph starting from a common parent node are considered extremity candidates of the object within the scene, and determining the extremities further comprises the following steps performed for the leaf nodes of the graph:
   defining the pixels of a first node that is adjacent to the respective leaf node of the graph for which the pixels have minimum distance from the respective leaf node,
   determining whether the number of pixels of said first node and the leaf node is higher than a threshold number of pixels, and
   if not, adding to the extremity pixels the pixels of a second node adjacent to the leaf node of the graph for which the pixels have a second lowest distance from said respective leaf node so that the extremity is defined by the threshold number of pixels from the leaf node, the first node, and the second node adjacent to the leaf node in the graph.

6. The method according to claim 5, wherein the pixels of the first node and the second node added to the respective extremity are selected by growing a circular pattern starting from the center of the pixels of the leaf node.

7. The method according to claim 1, wherein the slices correspond to respective different ranges of distances relative to said reference.

8. The method according to claim 7, wherein the width of the ranges is equal for all slices or the width of the ranges increases with increasing distance relative to the reference.

9. The method according to claim 1, wherein identifying, for each of the slices, the one or more connected regions of pixels of the two-dimensional array of pixels further comprises enumerating the connected regions for the graph building in order to facilitate identification of the nodes of the graph.

10. The method according to claim 9, wherein the connected regions of pixels are enumerated according to the respective slices they belong to and the respective slice's range of distance relative to the reference.

11. The method according to claim 1, wherein a first slice comprises those pixels which are in a first range of distances relative to said reference and a second slice comprises those pixels which are in a second range of distances relative to said reference, wherein a maximum distance relative to the reference in the first range is the minimum distance relative to the reference in the second range, and wherein a first connected region of pixels in the first slice defining a first node of the graph is interconnected to a second node corresponding to a second connected region of pixels in the second slice, in case the pixels of the first connected region border on the pixels of the second connected region.

12. The method according to claim 1, further comprising pruning the graph to simplify the graph, wherein pruning comprises at least one of the following:

in case the graph building resulted in two or more independent graphs, removing the one or more graphs that contain less than a threshold number of nodes or that correspond to connected regions of pixels having less than a threshold number of pixels;

merging a node corresponding to connected region of pixels of a size smaller than a threshold value with their respective parent node;

in case a child node is connected to two parent nodes in the graph, merging the child node and the parent node corresponding to the smaller connected region of pixels into a single child node to the other of the parent nodes;

in case two nodes at different relative distances to the reference in the graph are interconnected via interconnecting nodes in parallel paths of the graph, merging the interconnecting nodes in the parallel paths having the same relative distance to the reference point or plane into a single node;

merging nodes at a same relative distance to the reference and corresponding to connected regions of pixels of a size smaller than a threshold value to a single node at said relative distance, in case they are connected to a common parent node in the graph; and merging nodes at a same relative distance to the reference into a single node, in case the distance between their connected regions of pixels in the two-dimensional array of pixels or a three-dimensional space constructed from the two-dimensional array of pixels and the depth value is smaller than a threshold value.

13. The method according to claim 1, further comprising pruning the graph to simplify the graph, wherein pruning comprises a select combination of the following pruning steps:

in case the graph building resulted in two or more independent graphs, removing the one or more graphs that contain less than a threshold number of nodes or that correspond to connected regions of pixels having less than a threshold number of pixels;

merging a node corresponding to connected region of pixels of a size smaller than a threshold value with their respective parent node;

in case a child node is connected to two parent nodes in the graph, merging the child node and the parent node corresponding to the smaller connected region of pixels into a single child node to the other of the parent nodes;

in case two nodes at different relative distances to the reference in the graph are interconnected via interconnecting nodes in parallel paths of the graph, merging the interconnecting nodes in the parallel paths having the same relative distance to the reference point or plane into a single node;

merging nodes at a same relative distance to the reference and corresponding to connected regions of pixels of a size smaller than a threshold value to a single node at said relative distance, in case they are connected to a common parent node in the graph; and merging nodes at a same relative distance to the reference into a single node, in case the distance between their connected regions of pixels in the two-dimensional array of pixels or a three-dimensional space constructed from the two-dimensional array of pixels and the depth value is smaller than a threshold value.

14. The method according to claim 1, wherein the image data received from the sensor determines location of each point of the object in three-dimensional space.

15. The method according to claim 1, wherein the slicing of the image uses one of the following slicing methods:

a sensor parallel planar slicing, in which the pixels of the image are divided in slices based on relative distance of the pixels to a reference plane spanning at the sensor's location and being perpendicular to the sensor orientation, wherein each of the slices comprises those pixels having a distance to the reference plane perpendicular to the sensor orientation that lies within a range of distances defined for the respective slice;

a sensor centric spherical slicing, in which the pixels of the image are divided in slices based on the relative distance of the pixels to the sensor location serving as a reference point, wherein each of the slices comprises those pixels having a distance to the reference point that lies within a range of distances defined for the respective slice;

an object planar slicing, in which the pixels of the image are divided in slices based on the relative distance of the pixels to a reference plane within the scene, wherein each of the slices comprises those pixels having a distance to the reference plane that lies within a range of distances defined for the respective slice, or an object centric spherical slicing, in which the pixels of the image are divided in slices based on the relative distance of the pixels to a given reference point, wherein each of the slices comprises those pixels having a distance to a reference point that lies within a range of distances defined for the respective slice.

16. The method according to claim 15, wherein the slicing method used for slicing the image is selected responsive to user input.

17. A system for identifying extremities of an object within a scene, comprising:

a sensor to capture an image of an object within a scene and generate image data representing the image of the scene with the object, wherein said image data comprises a two-dimensional array of pixels and each pixel contains a depth value indicating distance from the sensor; and an image processing system operatively connected to said sensor to receive image data from the sensor, the image processing system being programmed to:

slice the image into slices, wherein each respective slice comprises those pixels with depth values that lie within a respective range of distances defined relative to a reference;

identify, for each of the slices, one or more connected regions of pixels that are neighbors in the two-dimensional array of pixels;

build, based on the connected regions of pixels that have been identified for the slices and depth information inherent to the respective slices, a graph consisting of interconnected nodes, wherein the connected regions form the nodes of the graph and the nodes are interconnected in the graph based on their relative distance to said reference; and determining extremities of the object based on the graph.

18. The system according to claim 17, wherein the image processing system slicing of the image uses one of the following slicing methods:

a sensor parallel planar slicing, in which the pixels of the image are divided in slices based on relative distance of the pixels to a reference plane spanning at the sensor's location and being perpendicular to the sensor orientation, wherein each of the slices comprises those pixels having a distance to the reference plane perpendicular to the sensor orientation that lies within a range of distances defined for the respective slice;

a sensor centric spherical slicing, in which the pixels of the image are divided in slices based on the relative distance of the pixels to the sensor location serving as a reference point, wherein each of the slices comprises those pixels having a distance to the reference point that lies within a range of distances defined for the respective slice;

an object planar slicing, in which the pixels of the image are divided in slices based on the relative distance of the pixels to a reference plane within the scene, wherein each of the slices comprises those pixels having a distance to the reference plane that lies within a range of distances defined for the respective slice, or an object centric spherical slicing, in which the pixels of the image are divided in slices based on the relative distance of the pixels to a given reference point, wherein each of the slices comprises those pixels having a distance to a reference point that lies within a range of distances defined for the respective slice.

* * * * *